(12) United States Patent
Ohama et al.

(10) Patent No.: US 8,388,466 B2
(45) Date of Patent: Mar. 5, 2013

(54) GOLF BALL

(75) Inventors: Keiji Ohama, Kobe (JP); Hirotaka Nakamura, Kobe (JP); Takahiro Sajima, Kobe (JP)

(73) Assignee: SRI Sports Limited, Kobe (JP)

( * ) Notice: Subject to any disclaimer, the term of this patent is extended or adjusted under 35 U.S.C. 154(b) by 567 days.

(21) Appl. No.: 12/366,415

(22) Filed: Feb. 5, 2009

(65) Prior Publication Data
US 2009/0221387 A1 Sep. 3, 2009

(30) Foreign Application Priority Data
Feb. 29, 2008 (JP) ................. 2008-049606

(51) Int. Cl.
*A63B 37/06* (2006.01)
(52) U.S. Cl. ........................ 473/377; 473/378
(58) Field of Classification Search .................. 473/377
See application file for complete search history.

(56) References Cited

U.S. PATENT DOCUMENTS

| | | | |
|---|---|---|---|
| 6,123,628 | A | 9/2000 | Ichikawa et al. |
| 6,346,053 | B1 | 2/2002 | Inoue et al. |
| 6,368,238 | B1 | 4/2002 | Kasashima et al. |
| 6,582,325 | B1 | 6/2003 | Ichikawa et al. |
| 2003/0064831 | A1* | 4/2003 | Ichikawa et al. ............. 473/378 |
| 2003/0064832 | A1 | 4/2003 | Ichikawa et al. |
| 2004/0138010 | A1 | 7/2004 | Ichikawa et al. |
| 2004/0142771 | A1* | 7/2004 | Sajima et al. .................. 473/378 |
| 2005/0113188 | A1* | 5/2005 | Sajima ........................ 473/383 |
| 2005/0187038 | A1 | 8/2005 | Sasaki et al. |
| 2005/0202904 | A1 | 9/2005 | Takesue et al. |
| 2005/0250599 | A1 | 11/2005 | Watanabe et al. |
| 2007/0117655 | A1 | 5/2007 | Kasashima et al. |

FOREIGN PATENT DOCUMENTS

| | | |
|---|---|---|
| JP | 11-89967 A | 4/1999 |
| JP | 11-178949 A | 7/1999 |
| JP | 2000-279553 A | 10/2000 |
| JP | 2002-336378 A | 11/2002 |
| JP | 2002-336386 A | 11/2002 |
| JP | 2005-230375 A | 9/2005 |
| JP | 2005-253962 A | 9/2005 |
| JP | 2005-319287 A | 11/2005 |
| JP | 2007-136173 A | 6/2007 |

OTHER PUBLICATIONS

Japanese Office Action dated Mar. 13, 2012 for Japanese Application No. 2008-049606.

* cited by examiner

*Primary Examiner* — Raeann Gorden
(74) *Attorney, Agent, or Firm* — Birch, Stewart, Kolasch & Birch, LLP (57) ABSTRACT

A golf ball 2 includes a core 4, a cover 6, and a paint layer 8. The golf ball 2 has numerous dimples 10 on the surface thereof. The cover 6 is formed of a resin composition including thermoplastic polyurethane (A) and a polyisocyanate mixture (B). The polyisocyanate mixture (B) includes a polyisocyanate compound (B1) having two or more isocyanate groups or a urethane prepolymer (B2) having two or more isocyanate groups. The cover 6 has a hardness of 30 or greater and 55 or less. The cover 6 has a thickness of 1.0 mm or greater and 2.0 mm or less. The ratio of the total volume of all the dimples 10 to the surface area of a phantom sphere of the golf ball is less than 75%. The dimples 10 have a curvature radius at the edge thereof in a range of 0.1 mm to 10 mm.

10 Claims, 5 Drawing Sheets

GOLF BALL

This application claims priority on Patent Application No. 2008-49606 filed in JAPAN on Feb. 29, 2008. The entire contents of this Japanese Patent Application are hereby incorporated by reference.

BACKGROUND OF THE INVENTION

1. Field of the Invention

The present invention relates to golf balls. In particular, the present invention relates to golf balls including a core and a cover.

2. Description of the Related Art

General golf balls include a core and a cover. For the cover, ionomer resin or polyurethane is used. The cover formed of ionomer resin has excellent resilience performance. On the other hand, the cover formed of polyurethane has excellent feel at impact, controllability, and scuff resistance. JP-A-2002-336378 (US2003/64,831 and US2004/138,010) discloses a golf ball with a cover formed of a resin composition including polyurethane and a polyisocyanate compound. The polyisocyanate compound enhances the scuff resistance of the cover. Similar covers are disclosed in JP-A-H11-178949 (U.S. Pat. No. 6,123,628 and 6,582,325), JP-A-2002-336386 (US2003/064,832), and JP-A-2005-253962 (US2005/202,904).

A golf ball has numerous dimples on the surface thereof. The dimples enhance the lift force that acts upon the golf ball and reduce drag. The reduction of a drag and the enhancement of the lift force are referred to as a "dimple effect". The dimple effect enhances the aerodynamic characteristic of the golf ball. In light of aerodynamic characteristic, various cross-sectional shapes of dimples have been proposed. JP-A-H11-89967 (U.S. Pat. No. 6,346,053) discloses dimples having a curvature radius at the edge in a range of 1 mm to 50 mm. JP-A-2000-279553 (U.S. Pat. No. 6,368,238) discloses dimples having a curvature radius at the edge in a range of 0.3 mm to 3.0 mm. JP-A-2005-230375 (US2005/187038) discloses dimples having a curvature radius at the edge in a range of 2.0 mm to 5.0 mm.

The golf ball is hit with golf clubs. The golf ball is required not to break even by the shock at impact. Further, the golf ball is required to be difficult to wear out even by frictional movement of the clubface thereagainst. Golf balls used at a driving range are repeatedly hit with golf clubs. The golf balls used at a driving range are particularly required to have excellent durability and wear resistance.

An objective of the present invention is to provide a golf ball having excellent durability and wear resistance.

SUMMARY OF THE INVENTION

A golf ball according to the present invention comprises a core and a cover positioned outside the core, and has numerous dimples on a surface of the cover. The cover is formed of a resin composition including thermoplastic polyurethane (A) and a polyisocyanate mixture (B). The polyisocyanate mixture (B) includes a polyisocyanate compound (B1) having two or more isocyanate groups or a urethane prepolymer (B2) having two or more isocyanate groups. The cover has a hardness, measured with a Shore D type hardness scale, of 30 or greater and 55 or less. The cover has a thickness of 1.0 mm or greater and 2.0 mm or less. A difference (Hb−Hc) between a hardness Hb of the golf ball and a hardness Hc of the core which are measured with the Shore D type hardness scale is equal to or greater than −10 and equal to or less than 10. A ratio of the total area of all the dimples to a surface area of a phantom sphere of the golf ball is less than 75%. The numerous dimples include a dimple having a curvature radius at an edge thereof in a range of 0.1 mm to 10 mm.

In the cover of the golf ball according to the present invention, the thermoplastic polyurethane (A) is crosslinked by the polyisocyanate compound (B1) having two or more isocyanate groups or the urethane prepolymer (B2) having two or more isocyanate groups. The resin obtained by this crosslinking has excellent strength. The cover formed of this resin is difficult to break by impact. This resin is difficult to wear out even by frictional movement of a clubface thereagainst. With the usage of the resin which has excellent strength and by the shapes of the dimples, the golf ball achieves excellent wear resistance.

Preferably, an amount of the polyisocyanate mixture (B) in the resin composition of the cover is equal to or greater than 1 part by weight and equal to or less than 40 parts by weight, per 100 parts by weight of the thermoplastic polyurethane (A).

Preferably, an amount of isocyanate groups in the polyisocyanate mixture (B) is equal to or greater than 0.1% by weight and equal to or less than 10% by weight.

Preferably, an MDI-based thermoplastic polyurethane is used for the cover. The MDI-based thermoplastic polyurethane is an elastomer in which a part or all of isocyanate as a material for a urethane component is 4,4'-diphenylmethane diisocyanate (MDI).

Preferably, the polyisocyanate mixture (B) includes a thermoplastic resin (B3) which substantially does not react with an isocyanate group. The polyisocyanate compound (B1) or the urethane prepolymer (B2) is dispersed in the thermoplastic resin (B3).

Preferably, a ratio of a number of dimples with a curvature radius at an edge thereof in a range of 0.1 mm to 10 mm, to the total number of the dimples, is equal to or greater than 50%.

Preferably, the numerous dimples include a dimple having a curvature radius at an edge thereof in a range of 0.1 mm to 1.0 mm.

Preferably, the thermoplastic polyurethane (A) includes a residue obtained by reacting thermoplastic polyurethane with a polyisocyanate compound (B1) having two or more isocyanate groups or with a urethane prepolymer (B2) having two or more isocyanate groups.

DESCRIPTION OF THE PREFERRED EMBODIMENTS

The following will describe in detail the present invention based on preferred embodiments with reference to the accompanying drawings.

Figure 1:
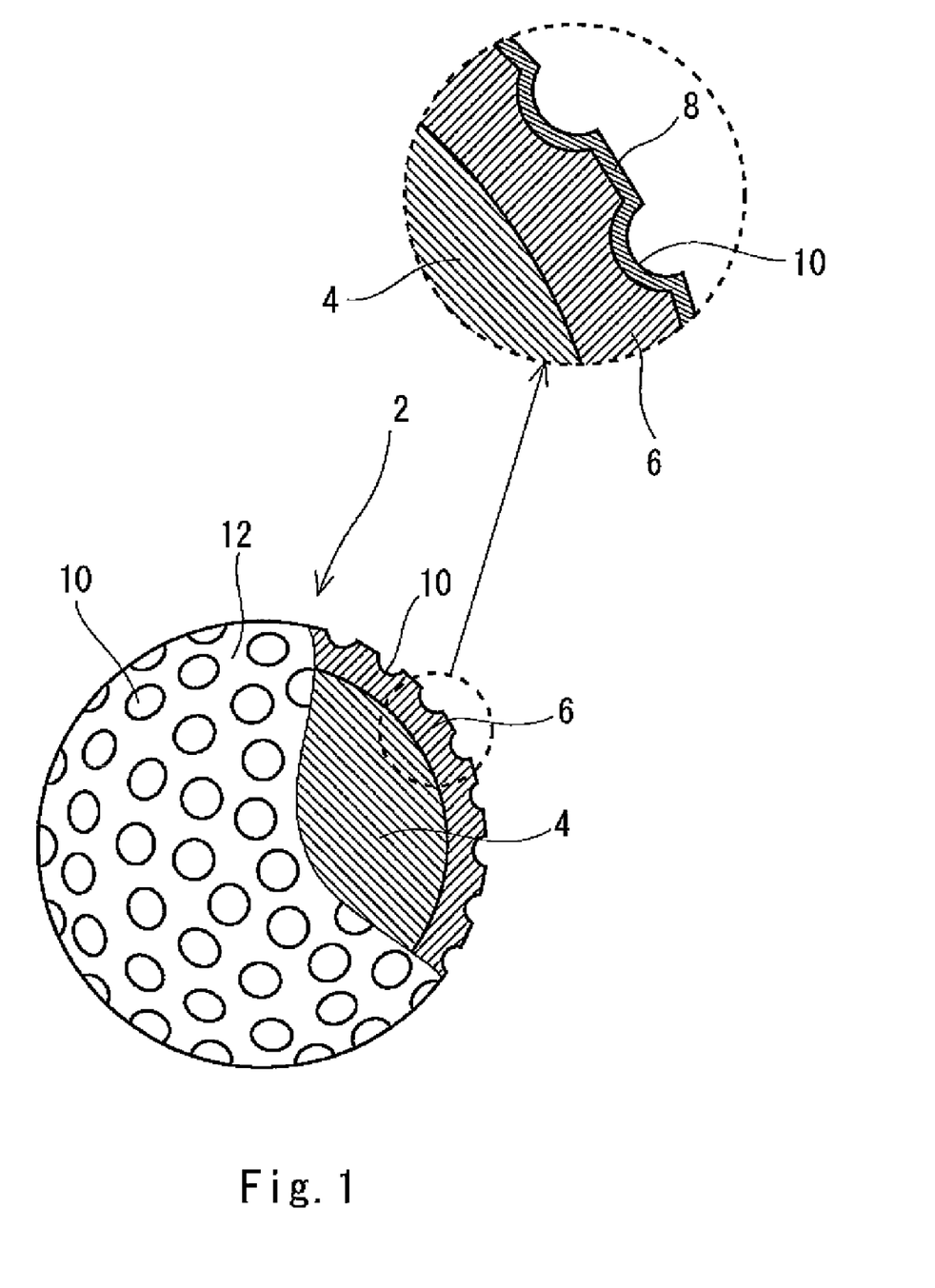
FIG. 1 is a schematic cross-sectional view of a golf ball according to one embodiment of the present invention.

Golf ball 2 shown in FIG. 1 includes a spherical core 4, a cover 6 covering the core 4, and a paint layer 8 covering the cover 6. The golf ball 2 has numerous dimples 10 on the surface thereof. Of the surface of the golf ball 2, a part except for the dimples 10 is a land 12. The golf ball 2 may include a mid layer between the core 4 and the cover 6.

The golf ball 2 has a diameter of 40 mm or greater and 45 mm or less. From the standpoint of conformity to the rules established by the United States Golf Association (USGA), the diameter of the golf ball 2 is preferably equal to or greater than 42.67 mm. In light of suppression of the air resistance, the diameter of the golf ball 2 is more preferably equal to or less than 44 mm, and particularly preferably equal to or less than 42.80 mm. The golf ball 2 has a weight of 40 g or greater and 50 g or less. In light of attainment of great inertia, the weight of the golf ball 2 is more preferably equal to or greater than 44 q, and particularly preferably equal to or greater than 45.00 g. From the standpoint of conformity to the rules established by the USGA, the weight of the golf ball 2 is particularly preferably equal to or less than 45.93 g.

The core 4 is obtained by crosslinking a rubber composition. Examples of the base rubber of the rubber composition include polybutadienes, polyisoprenes, styrene-butadiene copolymers, ethylene-propylene-diene copolymers and natural rubbers. In light of resilience performance, the polybutadienes are preferred. When other rubber is used in combination with a polybutadiene, it is preferred that the polybutadiene is included as a principal component. Specifically, the proportion of the polybutadiene in the entire base rubber is preferably equal to or greater than 50% by weight, andparticularly preferably equal to or greater than 80% by weight. A polybutadiene having cis-1,4 bonds in a proportion of preferably 40 mol % or greater and particularly preferably 80 mol % or greater is preferred.

In order to crosslink the core 4, a co-crosslinking agent is preferably used. Preferable examples of co-crosslinking agents in light of resilience performance include monovalent or bivalent metal salts of an $\alpha,\beta$-unsaturated carboxylic acid having 2 to 8 carbon atoms. Specific examples of preferable co-crosslinking agents include zinc acrylate, magnesium acrylate, zinc methacrylate and magnesium methacrylate. Zinc acrylate and zinc methacrylate are particularly preferred on the grounds that high resilience performance can be achieved.

As a co-crosslinking agent, an $\alpha,\beta$-unsaturated carboxylic acid having 2 to 8 carbon atoms, and metal oxide may be also blended. Both components react in the rubber composition and form a salt. This salt contributes to the crosslinking reaction. Examples of preferable $\alpha,\beta$-unsaturated carboxylic acids include acrylic acid and methacrylic acid. Examples of preferable metal oxides include zinc oxide and magnesium oxide.

In light of resilience performance of the golf ball 2, the amount of the co-crosslinking agent is preferably equal to or greater that 10 parts by weight and more preferably equal to or greater than 15 parts by weight or greater, per 100 parts by weight of the base rubber. In light of soft feel at impact, the amount of the co-crosslinking agent is preferably equal to or less than 50 parts by weight and more preferably equal to or less than 45 parts by weight, per 100 parts by weight of the base rubber.

Preferably, the rubber composition of the core 4 includes an organic peroxide together with a co-crosslinking agent. The organic peroxide serves as a crosslinking initiator. The organic peroxide contributes to the resilience performance of the golf ball 2. Examples of suitable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide. An organic peroxide with particularly high versatile is dicumyl peroxide.

In light of resilience performance of the golf ball 2, the amount of the organic peroxide is preferably equal to or greater than 0.1 part by weight, more preferably equal to or greater than 0.3 part by weight, and particularly preferably equal to or greater than 0.5 part by weight, per 100 parts by weight of the base rubber. In light of soft feel at impact, the amount of the organic peroxide is preferably equal to or less than 3.0 parts by weight, more preferably equal to or less than 2.8 parts by weight, and particularly preferably equal to or less than 2.5 parts by weight, per 100 parts by weight of the base rubber.

Preferably, the rubber composition of the core 4 includes an organic sulfur compound. Examples of preferable organic sulfur compounds include monosubstitution such as diphenyl disulfide, bis(4-chlorophenyl)disulfide, bis(3-chlorophenyl) disulfide, bis(4-bromophenyl)disulfide, bis(3-bromophenyl) disulfide, bis(4-fluorophenyl)disulfide, bis(4-iodophenyl) disulfide, and bis(4-cyanophenyl)disulfide; disubstitution such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, and bis(2-cyano-5-bromophenyl)disulfide; trisubstitution such as bis(2,4,6-trichlorophenyl)disulfide, and bis(2-cyano-4-chloro-6-bromophenyl)disulfide; tetrasubstitution such as bis(2,3,5,6-tetrachlorophenyl)disulfide; and pentasubstitution such as bis(2,3,4,5,6-pentachlorophenyl)disulfide, and bis(2,3,4,5,6-pentabromophenyl)disulfide. The organic sulfur compound contributes to the resilience performance of the golf ball 2. Particularly preferable organic sulfur compounds are diphenyl disulfide and bis(pentabromophenyl)disulfide.

In light of resilience performance of the golf ball 2, the amount of the organic sulfur compound is preferably equal to or greater than 0.1 part by weight and more preferably equal to or greater than 0.2 part by weight, per 100 parts by weight of the base rubber. In light of soft feel at impact, the amount of the organic sulfur compound is preferably equal to or less than 1.5 parts by weight, more preferably equal to or less than 1.0 part by weight, and particularly preferably equal to or less than 0.8 part by weight, per 100 parts by weight of the base rubber.

For the purpose of adjusting specific gravity and the like, a filler may be blended with the core 4. Examples of suitable fillers include zinc oxide, barium sulfate, calcium carbonate, and magnesium carbonate. Powder of a metal with a high relative density may be blended as a filler. Specific examples of the metal with a high relative density include tungsten and molybdenum. The amount of the filler is determined as appropriate so that the intended specific gravity of the core 4 can be accomplished. A particularly preferable filler is zinc oxide. Zinc oxide serves not only as a specific gravity adjuster but also as a crosslinking activator. Various types of additives such as a sulfur, an anti-aging agent, a coloring agent, a plasticizer, a dispersant and the like may be blended with the core 4 at an adequate amount as needed. Crosslinked rubber powder or synthetic resin powder may be also blended with the core 4.

The core 4 has a diameter of preferably 36 mm or greater and 40.8 mm or less. The core 4 having a diameter of 36 mm or greater contributes to the resilience performance of the golf ball 2. In this respect, the diameter is preferably equal to or greater than 38.0 mm and particularly preferably equal to or greater than 39 mm. By setting the diameter to be equal to or less than 40.8 mm, the core 4 contributes to durability. In this respect, the diameter is preferably equal to or less than 40.6 mm.

The core 4 has an amount of compressive deformation of preferably 2.4 mm or greater and 3.8 mm or less. The core 4 having an amount of compressive deformation of 2.4 mm or greater contributes to soft feel at impact of the golf ball 2. In this respect, the amount of compressive deformation is more preferably equal to or greater than 2.6 mm and particularly preferably equal to or greater than 2.8 mm. The core 4 having an amount of compressive deformation of 3.8 mm or less contributes to the resilience performance and the durability of the golf ball 2. In this respect, the amount of compressive deformation is more preferably equal to or less than 3.6 mm and particularly preferably equal to or less than 3.4 mm.

Upon measurement of the amount of compressive deformation, a spherical body (i.e., core 4 or golf ball 2) is first placed on a hard plate made of metal. Next, a cylinder made of metal gradually descends toward the spherical body. The spherical body squeezed between the bottom face of the cylinder and the hard plate becomes deformed. A migration distance of the cylinder, starting from the state in which an initial load of 98 N is applied to the spherical body up to the state in which a final load of 1274 N is applied thereto is the amount of compressive deformation.

The core 4 has a surface hardness Hc of preferably 40 or greater and 60 or less. The core 4 having a hardness Hc of 40 or greater contributes to the resilience performance of the golf ball 2. In this respect, the hardness Hc is more preferably equal to or greater than 45. The core 4 having a hardness Hc of 60 or less contributes to feel at impact of the golf ball 2. In this respect, the hardness Hc is more preferably equal to or less than 55. The hardness Hc is measured by pressing, against the surface of the core 4, a shore D type spring hardness scale mounted to an automated rubber hardness machine (trade name "P1", available from Koubunshi Keiki Co., Ltd.).

The core 4 has a weight of preferably 30 g or greater and 42 g or less. The temperature for crosslinking the core 4 is generally equal to or higher than 140° C. and equal to or less than 180° C. The time for crosslinking the core 4 is generally equal to or longer than 10 minutes and equal to or shorter than 60 minutes. The core 4 may be formed with two or more layers. The core 4 may have a rib on the surface thereof.

The cover 6 is formed of a resin composition. The resin composition includes thermoplastic polyurethane (A) and a polyisocyanate mixture (B). The principal component of the resin composition is the thermoplastic polyurethane (A). The thermoplastic polyurethane (A) is soft. When the golf ball 2 using the thermoplastic polyurethane (A) is hit with a short iron, a large spin rate is obtained. This golf ball 2 has excellent controllability. The cover 6 using the thermoplastic polyurethane (A) has excellent scuff resistance.

The thermoplastic polyurethane (A) has a urethane bond within the molecule. The urethane bond can be formed by reacting a polyol with a polyisocyanate. The polyol, as a material for the urethane bond, has a plurality of hydroxyl groups. Low molecular polyols and high molecular polyols can be used. Examples of low molecular polyols include diols, triols, tetraols and hexaols. Specific examples of diols include ethylene glycol, diethylene glycol, triethylene glycol, 1,2-propanediol, 1,3-propanediol, 2-methyl-1,3-propanediol, dipropylene glycol, 1,2-butanediol, 1,3-butanediol, 1,4-butanediol, 2,3-butanediol, 2,3-dimethyl-2,3-butanediol, neopentyl glycol, pentanediol, hexanediol, heptanediol, octanediol and 1,6-cyclohexanedimethylol. Aniline-based diolx or bisphenol A-based diols may be used. Specific examples of triols include glycerin, trimethylol propane and hexanetriol. Specific examples of tetraols include pentaerythritol and sorbitol.

Examples of high molecular polyols include a polyether polyol such as polyoxyethylene glycol (PEG), polyoxypropylene glycol (PPG) and polyoxytetramethylene glycol (PTMG); a condensed polyester polyol such as polyethylene adipate (PEA), polybutylene adipate (PBA) and polyhexamethylene adipate (PHMA); a lactone polyester polyol such as poly-ε-caprolactone (PCL); a polycarbonate polyol such as polyhexamethylene carbonate; and an acrylic polyol. In light of feel at impact of the golf ball 2, the high molecular polyol has a number average molecular weight of preferably 400 or greater and more preferably 1000 or greater. The number average molecular weight is preferably 10000 or less.

Examples of isocyanate, as a material for the urethane bond, include aromatic diisocyanates, alicyclic diisocyanates and aliphatic diisocyanates. Two or more types of diisocyanates may be used in combination.

Examples of aromatic diisocyanates include 2,4-toluene diisocyanate, 2,6-toluene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylene diisocyanate (TMXDI) and paraphenylene diisocyanate (PPDI). One example of aliphatic diisocyanates is hexamethylene diisocyanate (HDI). Examples of alicyclic diisocyanates include 4,4'-dicyclohexylmethane diisocyanate ($H_{12}$MDI), 1,3-bis(isocyanatemethyl)cyclohexane ($H_6$XDI), isophorone diisocyanate (IPDI) and trans-1,4-cyclohexyl diisocyanate (CHDI).

Particularly preferable thermoplastic polyurethane (A) is an MDI-based polyurethane. In this polyurethane, a part or all of isocyanate, as a material for a urethane component, is 4,4'-diphenylmethane diisocyanate (MDI). The MDI-based thermoplastic polyurethane has excellent versatility. This polyurethane is inexpensive. This polyurethane is suitable for the golf ball 2 used at a driving range.

Thermoplastic polyurethane (A) whose chain is extended by polyamine can be used. This polyamine has two or more amino groups. Aliphatic polyamines such as ethylenediamine, propylenediamine, butylenediamine and hexamethylenediamine; alicyclic polyamines such as isophoronediamine and piperazine; and aromatic polyamine can be used.

Examples of the thermoplastic polyurethane (A) include:
(1) A type obtained from polyisocyanate and high molecular polyol;
(2) A type obtained from polyisocyanate, high molecular polyol and low molecular polyol;
(3) A type obtained from polyisocyanate, high molecular polyol and polyamine; and
(4) A type obtained from polyisocyanate, high molecular polyol, low molecular polyol and polyamine.

The polyisocyanate mixture (B) includes a polyisocyanate compound (B1) having two or more isocyanate groups or a urethane prepolymer (B2) having two or more isocyanate groups. The polyisocyanate mixture (B) further includes a thermoplastic resin (B3) which does not substantially react with an isocyanate group. By the heat applied during formation of the cover 6, the polyisocyanate compound (B1) and the urethane prepolymer (B2) react with the thermoplastic polyurethane (A). By this reaction, the molecules of the thermoplastic polyurethane (A) are crosslinked with each other. The cover 6 formed of the crosslinked thermoplastic polyurethane (A) is difficult to break even when subjected to impact. In addition, the cover 6 is difficult to wear out when a clubface frictionally moves thereagainst.

As the polyisocyanate compound (B1) having two or more isocyanate groups, the isocyanate described above as a material for the thermoplastic polyurethane (A) can be used. In light of easy handling, 4,4'-diphenylmethane diisocyanate (MDI) is particularly preferable.

The urethane prepolymer (B2) has a urethane bond and two or more isocyanate groups. The prepolymer (B2) has a smaller molecular weight than the thermoplastic polyurethane (A). The prepolymer (B2) can be obtained by reacting a polyol with a polyisocyanate. The polyol described above as a material for the thermoplastic polyurethane (A) can be used as a material for the prepolymer (B2). The polyisocyanate described as a material for the thermoplastic polyurethane (A) can be used as a material for the prepolymer (B2). 4,4'-diphenylmethane diisocyanate (MDI) which has excellent versatility is preferable. Urethane prepolymer (B2) having an isocyanate group at an end thereof can be obtained by reacting a polyol with a polyisocyanate in a state where a polyisocyanate component is excessive. The mole ratio (NCO/OH) at the time of reaction is preferably equal to or greater than 1.1, more preferably equal to or greater than 1.3, and particularly preferably equal to or greater than 1.5. The mole ratio (NCO/OH) is preferably equal to or less than 3.0 and more preferably equal to or less than 2.0.

When the thermoplastic polyurethane (A) is crosslinked by the polyisocyanate compound (B1), the hardness of the cover 6 is increased. On the other hand, because the urethane prepolymer (B2) includes a urethane component, even when the thermoplastic polyurethane (A) is crosslinked by the urethane prepolymer (B2), the hardness of the cover 6 is not increased considerably. The cover 6 which uses the urethane prepolymer (B2) maintains its flexibility. By the urethane prepolymer (B2), the controllability, the scuff resistance, the durability and the wear resistance of the golf ball 2 are balanced.

In light of sufficient crosslinking of the thermoplastic polyurethane (A), the amount of isocyanate group (NCO %) in the urethane prepolymer (B2) having two or more isocyanate groups is preferably equal to or greater than 0.1% by weight, more preferably equal to or greater than 0.2% by weight, and particularly preferably equal to or greater than 0.3% by weight. In light of ease of forming the cover 6, the isocyanate group amount is preferably equal to or less than 10% by weight, more preferably equal to or less than 7% by weight, and particularly preferably equal to or less than 5% by weight. The isocyanate group amount X is calculated by the following formula.

$$X=((I*42)/M)*100$$

In the formula, I denotes a number of moles of isocyanate group, M denotes the mass (g) of the urethane prepolymer (B2), and 42 is the molecular weight of NCO.

In light of flexibility of the cover 6, the urethane prepolymer (B2) having two or more isocyanate groups has a number average molecular weight of preferably 1000 or greater, more preferably 1500 or greater, and particularly preferably 2000 or greater. In light of wear resistance of the cover 6, the urethane prepolymer (B2) has a number average molecular weight of preferably 30000 or less, more preferably 20000 or less, and particularly preferably 10000 or less.

The preferable urethane prepolymer (B2) is represented by the following formula.

In the formula, n denotes an integer number of 1 or greater. In light of flexibility of the cover 6, n is preferably equal to or less than 10, more preferably equal to or less than 5, and particularly preferably equal to or less than 4. The urethane prepolymer (B2) represented by the above formula has polyisocyanate at both ends thereof. Preferably, the urethane prepolymer (B2) has difunctional polyisocyanate at both ends thereof.

In the polyisocyanate mixture (B), the polyisocyanate compound (B1) or the urethane prepolymer (B2) is dispersed in the thermoplastic resin (B3). The thermoplastic resin (B3) does not substantially react with an isocyanate group. In other words, the thermoplastic resin (B3) does not have hydrogen within the molecule which has a potential to react with an isocyanate group. By being dispersed in the thermoplastic resin (B3), the polyisocyanate compound (B1) or the urethane prepolymer (B2) is prevented from being deactivated. In addition, by being dispersed in the thermoplastic resin (B3), the polyisocyanate compound (B1) or the urethane prepolymer (B2) is easily mixed with the thermoplastic polyurethane (A).

As the thermoplastic resin (B3) which does not substantially react with an isocyanate group, an elastomer having rubber elasticity is suitable. Specific examples of the elastomer include a thermoplastic polyester elastomer, a styrene block-containing thermoplastic elastomer, a thermoplastic polyolefin elastomer, a thermoplastic acrylic elastomer and a thermoplastic vinyl chloride elastomer. Particularly, a thermoplastic polyester elastomer and a styrene block-containing thermoplastic elastomer are preferable. One specific example of the thermoplastic polyester elastomer is trade name "Hytrel (e.g. 3046, 3548, 4047)" available from DU PONT-TORAY Co., Ltd. One specific example of the styrene block-containing thermoplastic elastomer is trade name "Rabalon" available from Mitsubishi Chemical Corporation. Polystyrene, polyvinyl chloride, acrylic resin, acrylonitrile-butadiene-styrene copolymer, polyester, polycarbonate, polyolefin, polyacetal, fluororesin and ionomer resin may be used as the thermoplastic resin (B3) which does not substantially react with an isocyanate group.

The amount of the polyisocyanate compound (B1) or the urethane prepolymer (B2) and the amount of the thermoplastic resin (B3) in the polyisocyanate mixture (B) are adjusted such that a predetermined isocyanate group amount (NCO %) is achieved. In light of sufficient crosslinking of the thermoplastic polyurethane (A), the isocyanate group amount (NCO %) in the polyisocyanate mixture (B) is preferably equal to or greater than 0.1% by weight, more preferably equal to or greater than 0.2% by weight, and particularly preferably equal to or greater than 0.3% by weight. In light of formability of the cover 6, the isocyanate group amount (NCO %) in the polyisocyanate mixture (B) is preferably equal to or less than 10% by weight, more preferably equal to or less than 7% by weight, and particularly preferably equal to or less than 5% by weight.

The amount of the polyisocyanate mixture (B) in the resin composition of the cover 6 is preferably equal to or greater than 1 part by weight per 100 parts by weight of the thermoplastic polyurethane (A). By setting the amount of the polyisocyanate mixture (B) to be equal to or greater than 1 part by weight, the thermoplastic polyurethane (A) can be sufficiently crosslinked. In this respect, the amount of the polyisocyanate mixture (B) is preferably equal to or greater than 4 parts by weight and particularly preferably equal to or greater than 6 parts by weight. In light of formability of the cover 6, the amount of the polyisocyanate mixture (B) is preferably equal to or less than 40 parts by weight, more preferably equal to or less than 30 parts by weight, and particularly preferably equal to or less than 25 parts by weight.

As described above, the principal component of the base resin of the cover 6 is the thermoplastic polyurethane (A). The ratio of the thermoplastic polyurethane (A) to all the resin is preferably equal to or greater than 50% by weight, more preferably equal to or greater than 60% by weight, and particularly preferably equal to or greater than 70% by weight. For the cover 6, other resin may be used together with the thermoplastic polyurethane (A). Examples of the other resin include a thermoplastic polyamide elastomer, a styrene block-containing thermoplastic elastomer, a thermoplastic polyester elastomer, a thermoplastic polyolefin elastomer and an ionomer resin.

Preferably, the resin composition of the cover 6 includes an ultraviolet absorber. An ultraviolet absorber which can absorb a beam of light with a wavelength of from 280 nm to 400 nm is preferable. A benzotriazole UV absorber, a salicylic acid derivative UV absorber, a benzophenone UV absorber and a cyanoacrylate UV absorber can be used. A benzotriazole UV absorber is particularly preferable. Some specific examples of preferable ultraviolet absorbers are trade names "TINUVIN P", "TINUVIN 234", and "TINUVIN 360", available from Ciba Specialty Chemicals Inc. The amount of the ultraviolet absorber is preferably equal to or greater than 0.01 part by weight, more preferably equal to or greater than 0.1 part by weight, and particularly preferably equal to or greater than 1 part by weight, per 100 parts by weight of the base resin. The amount of the ultraviolet absorber is preferably equal to or less than 10 parts by weight and particularly preferably equal to or less than 5 parts by weight, per 100 parts by weight of the base resin.

A coloring agent such as titanium dioxide, a filler such as barium sulfate, a dispersant, an antioxidant, a light stabilizer, a fluorescent material, a fluorescent brightener, and the like are blended with the cover 6 at an adequate amount as needed.

When preparing the resin composition of the cover 6, the polyisocyanate compound (B1) or the urethane prepolymer (B2) is blended with the thermoplastic resin (B3), which does not substantially react with an isocyanate group, to obtain first pellets. Meanwhile, various additives are added to the thermoplastic polyurethane (A) to obtain second pellets. The first pellets and the second pellets are mixed by dry blending to obtain a resin composition. By using the dry blending method, the crosslinking reaction of the thermoplastic polyurethane (A) with an isocyanate group is suppressed at the blending stage. The resin composition, in which the crosslinking reaction is suppressed, has a low viscosity when melting. The melting resin composition has excellent fluidity.

The cover 6 is formed of the resin composition. The cover 6 can be formed by injection molding or compression molding. Because the resin composition has excellent fluidity as described above, the cover 6 can be easily formed. In light of productivity, injection molding is preferable. During the injection molding process, the resin composition is heated to be melted, and the melting resin composition is injected into a cavity. Then, the resin composition is cooled to be solidified. At the injection of the resin composition, crosslinking of the thermoplastic polyurethane (A) by the polyisocyanate mixture (B) starts, and the crosslinking reaction proceeds in the cavity. By the crosslinking reaction, strength is provided to the cover 6. The cover 6 is difficult to break, even by repeated hitting. The cover 6 is also difficult to wear out by frictional movement of a clubface thereagainst.

When forming the cover 6, residue such as spew and runner occurs. The residue can be reused as the thermoplastic polyurethane (A). Because crosslinking by isocyanate group has already taken place in the residue, the cover 6 can have a high crosslinking density by using the residue. In light of crosslinking density, residue with a thermal history of a temperature of 180° C. or higher is preferable. Thermoplastic polyurethane which is not crosslinked by isocyanate group and the residue may be used in combination. In this case, in light of crosslinking density, the ratio of the amount of residue to the entire amount of thermoplastic polyurethane (A) is preferably equal to or greater than 10% by weight, more preferably equal to or greater than 20% by weight, and particularly preferably equal to or greater than 30% by weight. In light of fluidity of the resin composition, this ratio is preferably equal to or less than 70% by weight and more preferably equal to or less than 50% by weight.

The cover 6 has a hardness of preferably 30 or greater and 55 or less. The golf ball 2 with the cover 6 having a hardness of 30 or greater has excellent resilience performance. In this respect, the hardness of the cover 6 is preferably equal to or greater than 40 and particularly preferably equal to or greater than 42. The golf ball 2 with the cover 6 having a hardness of 55 or less has excellent feel at impact and durability. In this respect, the hardness of the cover 6 is preferably equal to or less than 52 and particularly preferably equal to or less than 50. The hardness is measured according to the standards of "ASTM-D 2240-68" with a shore D type spring hardness scale mounted to an automated rubber hardness machine (trade name "P1", available from Koubunshi Keiki Co., Ltd.). For the measurement, a slab formed by hot press and having a thickness of about 2 mm is used. The slab is maintained at a temperature of 23° C. for two weeks for the measurement. At the measurement, three slabs are stacked. The slab formed of the same resin composition as the cover 6 is used.

In light of durability of the golf ball 2, the cover 6 has a thickness of preferably 1.0 mm or greater, more preferably 1.3 mm or greater, and particularly preferably 1.5 mm or greater. In light of resilience performance of the golf ball 2, the cover 6 has a thickness of preferably 2.0 mm or less, more preferably 1.9 mm or less, and particularly preferably 1.8 mm or less.

The paint layer 8 is formed by applying paint to the cover 6. Urethane paint, epoxy paint, acrylic paint and the like can be used. In light of adhesion to the cover 6, urethane paint is preferable. In light of durability of the paint layer 8, two-component curing type urethane paint is preferable. Preferably, the paint layer 8 includes an ultraviolet absorber. The aforementioned ultraviolet absorber included in the cover 6 can be used in the paint layer B.

The golf ball 2 has an amount of compressive deformation of preferably 2.2 mm or greater and 4.0 mm or less. The golf ball 2 with an amount of compressive deformation of 2.2 mm or greater has excellent feel at impact. In this respect, the amount of compressive deformation is preferably equal to or greater than 2.4 mm and particularly preferably equal to or greater than 2.7 mm. The golf ball 2 with an amount of compressive deformation of 4.0 mm or less has excellent resilience performance. In this respect, the amount of compressive deformation is preferably equal to or less than 3.5 mm and particularly preferably equal to or less than 3.3 mm.

In light of resilience performance, the golf ball 2 has a surface hardness Hb of preferably 45 or greater and more preferably 50 or greater. In light of feel at impact and durability, the golf ball 2 has a surface hardness Hb of preferably 62 or less, more preferably 60 or less, and particularly preferably 58 or less. The hardness Hb is measured by pressing, against the surface of the golf ball 2, a shore D type spring hardness scale mounted to an automated rubber hardness machine (trade name "P1", available from Koubunshi Keiki Co., Ltd.).

The difference (Hb−Hc) between the hardness Hb of the golf ball 2 and the hardness Hc of the core 4 is preferably equal to or greater than −10 and equal to or less than 10. In the golf ball 2 with a difference (Hb−Hc) of −10 or greater, spin is suppressed, and a long flight distance is obtained. In this respect, the difference (Hb−Hc) is preferably equal to or greater than −8 and particularly preferably equal to or greater than −5. The golf ball 2 with a difference (Hb−Hc) of 10 or less has excellent wear resistance. In this respect, the difference (Hb−Hc) is preferably equal to or less than 8 and particularly preferably equal to or less than 5.

Figure 2:
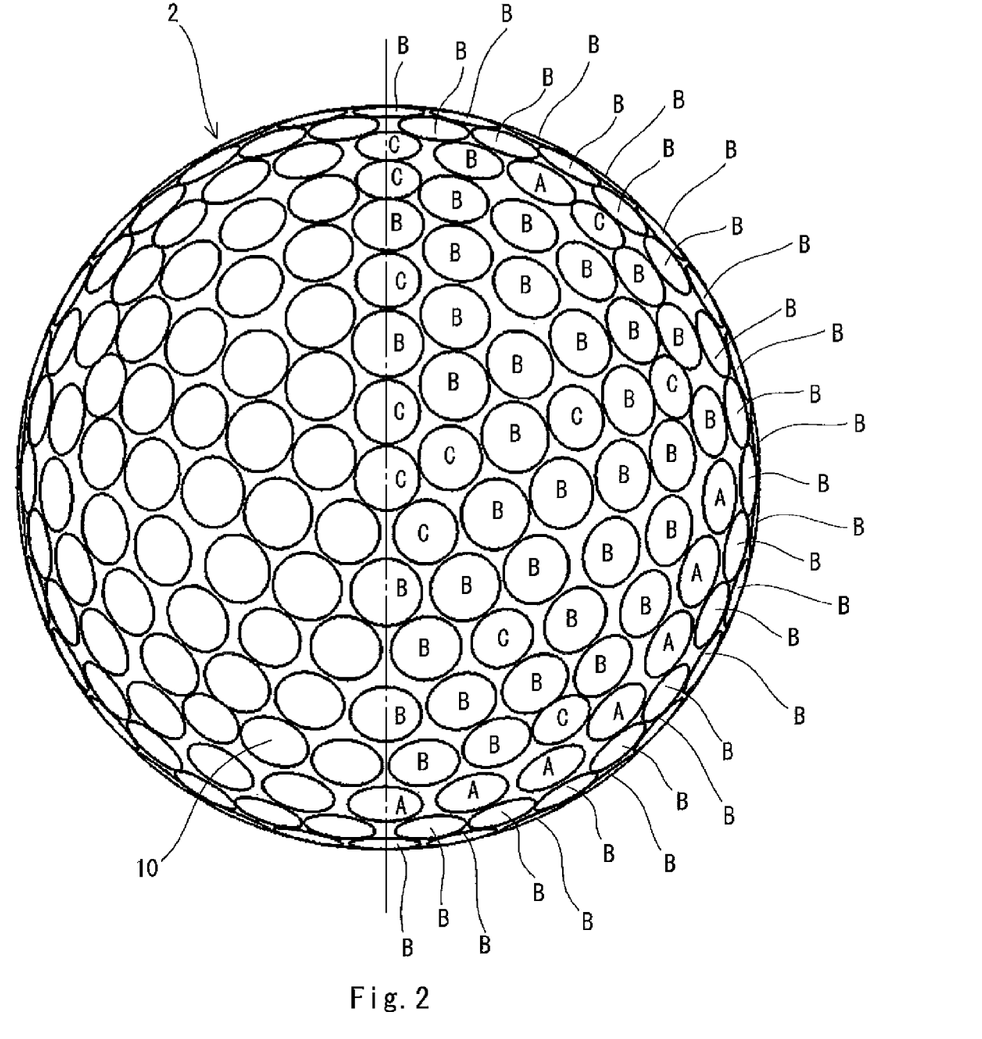
FIG. 2 is an enlarged plan view of the golf ball in FIG. 1.
Figure 3:
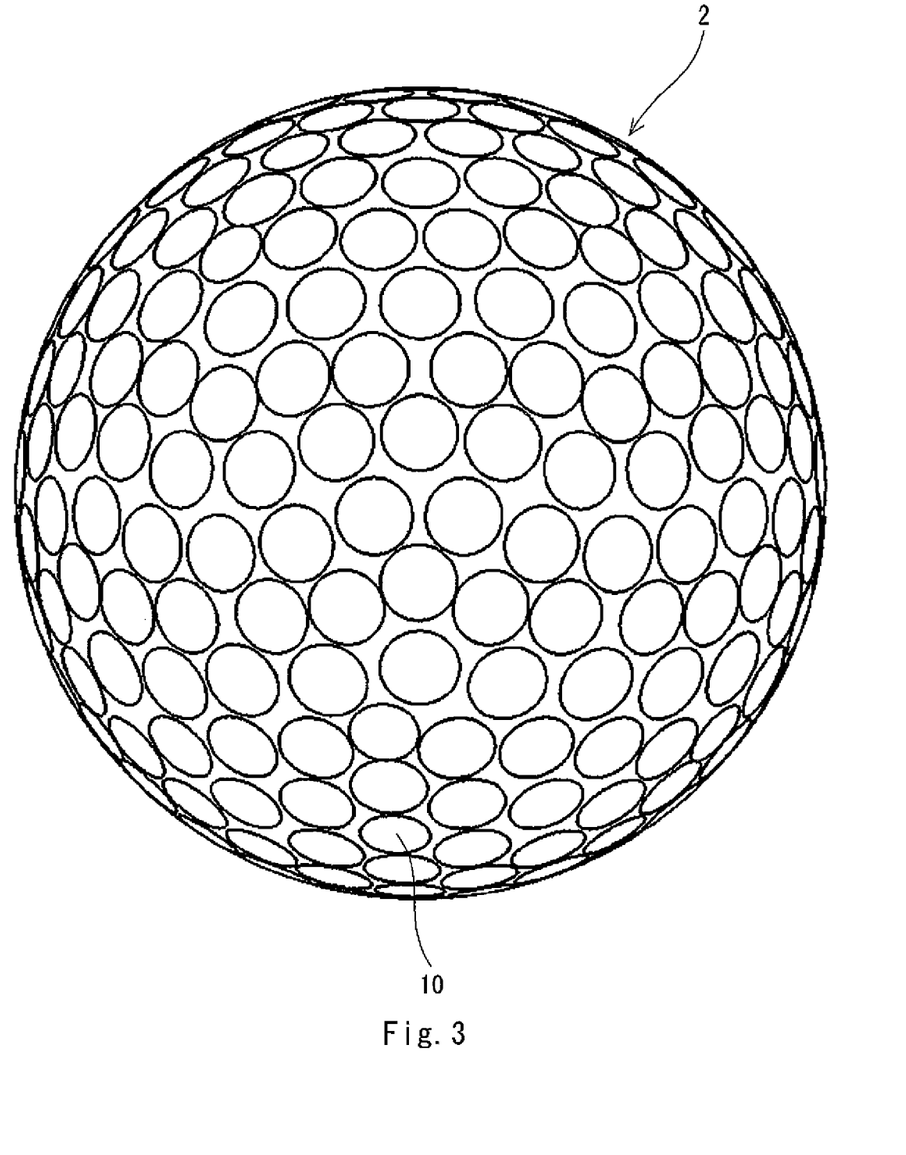
FIG. 3 is an enlarged front view of the golf ball in FIG. 1.

FIG. 2 is an enlarged plan view of the golf ball 2 in FIG. 1, and FIG. 3 is an enlarged front view of the golf ball 2 in FIG. 1. In FIG. 2, when the surface of the golf ball 2 is divided into 4 equivalent units, kinds of the dimples 10 in one unit are indicated by the reference signs A to C. The golf ball 2 has dimples A with a diameter of 4.254 mm, dimples B with a diameter of 4.086 mm, and dimples C with a diameter of 3.715 mm. The number of the dimples A is 30, the number of the dimples B is 256, and the number of the dimples C is 38. The total number of the dimples 10 is 324.

Figure 4:
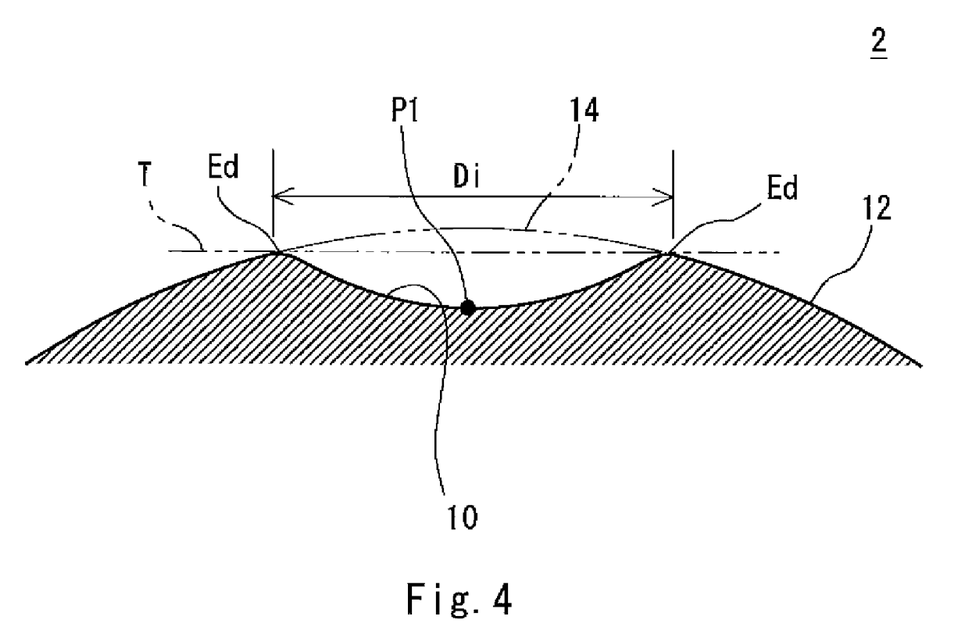
FIG. 4 is a partially enlarged cross-sectional view of the golf ball in FIG. 1.

FIG. 4 is a partially enlarged cross-sectional view of the golf ball 2 in FIG. 1. In FIG. 4, a cross section along a plane passing through the deepest part P1 of the dimple 10 and the center of the golf ball 2 is shown. In FIG. 4, the top-to-bottom direction is the depth direction of the dimple 10. What is indicated by a chain double-dashed line 14 in FIG. 4 is a phantom sphere. The dimple 10 is recessed from the surface of the phantom sphere 14. The land 12 agrees with the surface of the phantom sphere 14.

In FIG. 4, what is indicated by a double ended arrow Di is the diameter of the dimple 10. This diameter Di is a distance between two tangent points Ed appearing on a tangent line T which is drawn tangent to the far opposite ends of the dimple 10. The tangent point Ed is also the edge of the dimple 10. The edge Ed defines the contour of the dimple 10. In the case of a non-circular dimple 10, a circle with the same area as the area of the contour shape is assumed, and the diameter of the circle is regarded as the diameter of the non-circular dimple 10.

Figure 5:
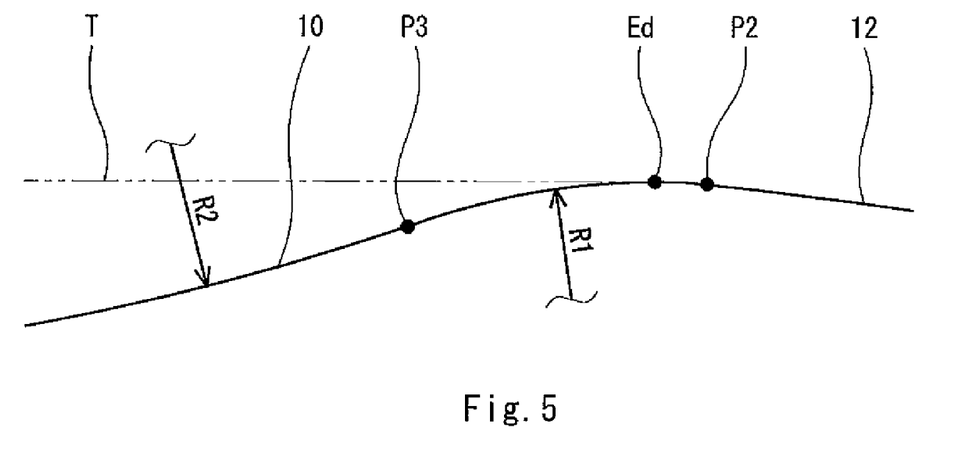
FIG. 5 is a partially enlarged cross-sectional view of the golf ball in FIG. 4.

FIG. 5 is a further enlarged cross-sectional view of the golf ball 2 in FIG. 4. FIG. 5 shows the edge Ed. The edge Ed is the boundary between the dimple 10 and the land 12. A point P2 shown in FIG. 5 is located on the land 12. A point P3 shown in FIG. 5 is located on the dimple 10. The edge Ed is located between the point P2 and the point P3.

In the cross section shown in FIG. 5, a part from the point P2 to the point P3 is a circular arc with a curvature radius R1. The circular arc includes the edge Ed. In the present specification, the circular arc including the edge Ed is referred to as an "edge arc". The edge arc is upwardly convex. The edge arc is in contact with the land 12 at the point P2. There may be another curve between the edge arc and the land 12. The curvature radius R1 is measured in a 50 times enlarged figure of the cross section of the dimple 10. When a curve including the edge Ed is not a circular arc, a curve between a point 0.5 mm outward of the edge Ed and a point 0.5 mm inward of the edge Ed is approximated as a circular arc, and the curvature radius R1 is determined.

In the cross section shown in FIG. 5, a part inward the point P3 is a circular arc with a curvature radius R2. The circular arc includes the deepest part P1 (see FIG. 4). In the present specification, the circular arc including the deepest part P1 is referred to as a "dimple arc". The dimple arc is downwardly concave. The dimple arc is in contact with the edge arc at the point P3. There may be another curve between the dimple arc and the edge arc.

In the golf ball 2 having the edge arc, when a clubface frictionally moves against the golf ball 2, stress does not concentrate on a specific point. Thus, the cover 6 is difficult to wear out. The golf ball 2 can have excellent wear resistance by the synergetic effect of the thermoplastic polyurethane (A) crosslinked by isocyanate group and the dimple 10 with the edge arc. The appearance of the golf ball 2 with excellent wear resistance is difficult to damage even by repeated hitting. In the golf ball 2 with excellent wear resistance, the dimples 10 are difficult to disappear even by repeated hitting. The golf ball 2 used at a driving range is repeatedly hit. The golf ball 2 according to the present invention is particularly suitable for use at a driving range.

The curvature radius R1 of the edge arc is preferably equal to or greater than 0.1 mm and equal to or less than 10 mm. The edge arc with a curvature radius R1 of 0.1 mm or greater contributes to the wear resistance. In this respect, the curvature radius R1 is preferably equal to or greater than 0.3 mm and particularly preferably equal to or greater than 0.5 mm. The edge arc with a curvature radius R1 of 10 mm or less does not impair the dimple effect. In this respect, the curvature radius R1 is preferably equal to or less than 5 mm, more preferably equal to or less than 2 mm, and particularly preferably equal to or less than 1.0 mm.

Dimples 10 having the edge arc with a curvature radius R1 in the above range and other dimples 10 may coexist in the golf ball 2. In light of wear resistance, the ratio of the number of the dimples 10 having the edge arc with a curvature radius R1 in the above range to the total number of the dimples 10 is preferably equal to or greater than 50%, more preferably equal to or greater than 60%, and particularly preferably equal to or greater than 70%. The ideal ratio is 100%.

Area S of the dimple 10 is an area of a region surrounded by the contour line when the center of the golf ball 2 is viewed at infinity. In the case of a circular dimple 10, the area S is calculated by the following formula.

$$S=(Di/2)^2*\pi$$

In the golf ball 2 shown in FIGS. 2 and 3, the area of the dimple A is 14.21 mm$^2$, the area of the dimple B is 13.11 mm$^2$, and the area of the dimple C is 10.84 mm$^2$.

In the present invention, the ratio of the sum of the areas S of all the dimples 10 to the surface area of the phantom sphere 14 is referred to as an occupation ratio Y. The occupation ratio Y is preferably less than 75%. In other words, the ratio of the area of the land 12 to the surface area of the phantom sphere 14 is preferably equal to or greater than 25%. In the golf ball 2 having an occupation ratio less than 75%, the area of contact between the land 12 and the golf club when hitting the golf ball 2 with a golf club is large. Thus, when hitting the golf ball 2 with the golf club, the pressure acting on the land 12 is small. This golf ball 2 has excellent wear resistance. This golf ball 2 is suitable for use at a driving range. In light of wear resistance, the occupation ratio Y is preferably equal to or less than 73%. In light of aerodynamic characteristic, the occupation ratio Y is preferably equal to or greater than 60% and more preferably equal to or greater than 65%. According to the golf ball 2 shown in FIGS. 2 and 3, the total area of the dimples 10 is 4195.0 mm$^2$. The surface area of the phantom sphere 14 of the golf ball 2 is 5754.9 mm$^2$, and thus the occupation ratio Y is 73%.

According to the present invention, the term "dimple volume" means the volume of a part surrounded by the surface of the dimple 10 and a plane that includes the contour of the dimple 10. In light of suppression of rising of the golf ball 2 during flight, the total volume of the dimples 10 is preferably equal to or greater than 250 mm$^3$, more preferably equal to or greater than 260 mm$^3$, and particularly preferably equal to or greater than 270 mm$^3$. In light of suppression of dropping of the golf ball 2 during flight, the total volume of the dimples 10 is preferably equal to or less than 400 mm$^3$ more preferably equal to or less than 390 mm³, and particularly preferably equal to or less than 380 mm³.

In light of suppression of rising of the golf ball 2 during flight, the depth of the dimple 10 is preferably equal to or greater than 0.05 mm, more preferably equal to or greater than 0.08 mm, and particularly preferably equal to or greater than 0.10 mm. In light of suppression of dropping of the golf ball 2 during flight, the depth of the dimple 10 is preferably equal to or less than 0.60 mm, more preferably equal to or less than 0.45 mm, and particularly preferably equal to or less than 0.40 mm. The depth is the distance between the tangent line T and the deepest part P1 of the dimple 10.

In light of the dimple effect, the diameter Di of the dimple 10 is preferably equal to or greater than 2.0 mm, more preferably equal to or greater than 2.2 mm, and particularly preferably equal to or greater than 2.4 mm. From the standpoint that fundamental feature of the golf ball 2 being substantially a sphere is maintained, the diameter Di is preferably equal to or less than 6.0 mm, more preferably equal to or less than 5.8, and particularly preferably equal to or less than 5.6 mm.

From the standpoint that sufficient dimple effect can be achieved, the total number of the dimples 10 is preferably equal to or greater than 280, more preferably equal to or greater than 300, and particularly preferably equal to or greater than 320. From the standpoint that individual dimples 10 can have a sufficient diameter, the total number is preferably equal to or less than 480, more preferably equal to or less than 450, and particularly preferably equal to or less than 400.

The golf ball 2 shown in FIGS. 2 and 3 has three kinds of dimples 10, which are A to C. By setting the number of kinds to be three or more, great dimple effect is obtained. In this respect, the number of kinds is preferably equal to or greater than 4 and particularly preferably equal to or greater than 5. In light of ease of production, the number of kinds is preferably equal to or less than 16. Due to production errors and measurement errors, the measured value of the diameter varies. In the present invention, the dimple 10 of which the difference between the measured value and the designed value of the diameter is less than ±0.05 mm is regarded as a dimple 10 with a diameter of the designed value.

The various sizes of the dimple 10, such as diameter, depth, and curvature radius, are measured on the golf ball 2 to which paint has been applied. If measuring the golf ball 2 to which paint has been applied is not feasible, the size of the dimple 10 may be measured on the golf ball 2 to which paint has not been applied, or on a mold for convenience's sake.

EXAMPLES

Example 1

A rubber composition (b) was obtained by kneading 100 parts by weight of high-cis polybutadiene (trade name "BR-730", available from JSR Corporation), 35 parts by weight of zinc diacrylate, 5 parts by weight of zinc oxide, an appropriate amount of barium sulfate, 0.5 part by weight of diphenyl disulfide (available from Sumitomo Seika Chemicals Co., Ltd.), and 0.7 part by weight of dicumyl peroxide (available from NOF Corporation). This rubber composition (b) was placed into a mold having upper and lower mold halves each having a hemispherical cavity, and heated at 170° C. for 30 minutes to obtain a core with a diameter of 39.2 mm. Meanwhile, a resin composition was obtained by kneading 100 parts by weight of thermoplastic polyurethane (trade name "Elastollan 1195ATR", available from BASF Japan Ltd.), 20 parts by weight of a urethane prepolymer mixture, and 3 parts by weight of titanium dioxide. The urethane prepolymer mixture includes 100 parts by weight of a urethane prepolymer and 200 parts by weight of a thermoplastic polyester elastomer (trade name "Hytrel 3046", available from DU PONT-TORAY Co., Ltd.). In the urethane prepolymer mixture, the urethane prepolymer is dispersed in the thermoplastic polyester elastomer. The urethane prepolymer is obtained by reacting 25 parts by weight of 4,4'-diphenylmethane diisocyanate having a number average molecular weight of 250 with 75 parts by weight of polyoxytetramethyleneglycol having a number average molecular weight of 1000. The resin composition was used for forming the cover of a golf ball, and the obtained runner was pulverized to obtain residue. A resin composition (f) was obtained by mixing 65 parts by weight of thermoplastic polyurethane (the aforementioned "Elastollan 1195ATR"), 35 parts by weight of the above residue, 20 parts by weight of a urethane prepolymer mixture, and 3 parts by weight of titanium dioxide. The above core was placed into a mold having numerous pimples on its inside face, followed by injection of the above resin composition (f) around the core by injection molding to form a cover with a thickness of 1.8 mm. Numerous dimples having a shape inverted from the shape of the pimples were formed on the cover. A clear paint including a two-component curing type polyurethane as a base was applied on this cover to obtain a golf ball of Example 1 having a diameter of 42.8 mm and a weight of about 45.4 g. The golf ball has the dimple pattern shown in FIGS. 2 and 3. The detailed specifications of the dimples are shown in the following Table 3.

Examples 2 to 5 and Comparative Examples 1 to 8

Golf balls of Examples 2 to 5 and Comparative Examples 1 to 8 were obtained in the similar manner as Example 1, except the specifications of the core, the cover and the dimples were as shown in the following Tables 4 and 5. The composition of the core is shown in detail in the following Table 1. The composition of the cover is shown in detail in the following Table 2. The specifications of the dimples are shown in detail in the following Table 3.

[Measurement of Coefficient of Restitution]

An aluminum hollow cylinder with a weight of 200 g was collided against a golf ball at a speed of 40 m/s. The speeds of the hollow cylinder before and after the collision and the speed of the golf ball were measure to obtain the coefficient of restitution of the golf ball. The average value of data obtained by 12 measurements is shown as an index in the following Tables 4 and 5.

[Evaluation of Durability]

A driver with a metal head was attached to a swing machine available from Golf Laboratories, Inc. The machine condition is set to have a head speed of 45 m/sec, and a golf ball was hit with the driver to collide against a plate. The number of times of hitting it takes to destroy the golf ball was measured. The average value of six golf balls was calculated. The result was shown as an index in the following Tables 4 and 5.

[Evaluation of Wear Resistance]

2500 g of abrasive media (trade name "AT3", available from Tipton Corp.) and 2500 ml of water were put into a ball mill with a capacity of 7 L, and 40 golf balls were put therein. The ball mill was rotated at 50 rpm for 8 hours. These golf balls were used to calculate a volume decrease rate Pd (%) based on the following formula.

$$Pd=((Va-Vb)/Va)*100$$

In the formula, Va denotes the dimple total volume (mm³) of the golf balls before being put into the ball mill and Vb denotes the dimple total volume (mm³) of the golf balls after the operation of the ball mill. The result is shown in the following Tables 4 and 5.

[Flight Distance Test]

A driver with a titanium head (Trade name "XXIO", available from SRI Sports Limited, shaft hardness: R, loft angle: 11°) was attached to a swing machine available from Golf Laboratories, Inc. The golf ball with a worn surface resulting from the above treatment for wear resistance evaluation was hit at a head speed of 40 m/sec. The distance from a launch point to a stopping point was measured. The average value of data obtained by 12 measurements is shown in the following Tables 4 and 5.

TABLE 1

Composition of Core (parts by weight)

|  | (a) | (b) | (c) |
|---|---|---|---|
| Polybutadiene | 100 | 100 | 100 |
| Zinc diacrylate | 33 | 35 | 30 |
| Zinc oxide | 5 | 5 | 5 |
| Barium sulfate | Appropriate amount | Appropriate amount | Appropriate amount |

TABLE 1-continued

Composition of Core (parts by weight)

|  | (a) | (b) | (c) |
|---|---|---|---|
| Diphenyl disulfide | 0.5 | 0.5 | 0.5 |
| Dicumyl peroxide | 0.8 | 0.7 | 0.7 |

TABLE 2

Composition of Cover

| | (d) | (e) | (f) | (g) | (h) |
|---|---|---|---|---|---|
| | | | | | (parts by weight) |
| Elastollan 1195ATR *1 | 65 | 65 | 65 | 65 | — |
| Residue | 35 | 35 | 35 | 35 | — |
| Elastollan ET858D *2 | — | — | — | — | 65 |
| Residue | — | — | — | — | 35 |
| Isocyanate compound *3 | — | 5 | — | 15 | 10 |
| Urethane prepolymer mixture | — | — | 20 | — | — |
| Titanium dioxide | 3 | 3 | 3 | 3 | 3 |
| Hardness (Shore D) | 48 | 48 | 48 | 49 | 57 |

*1 Thermoplastic polyurethane available from BASF Japan Ltd.
*2 Thermoplastic polyurethane available from BASF Japan Ltd.
*3 "Crossnate" available from Dainichiseika Color & Chemicals Mfg. Co., Ltd.

TABLE 3

Specifications of Dimples

| Type | Kind | Number | Diameter (mm) | Depth (mm) | Radius R2 (mm) | Volume (mm³) | Radius R1 (mm) | Total number | Occupation ratio (%) | Total volume (mm³) | Plan view Front view |
|---|---|---|---|---|---|---|---|---|---|---|---|
| I | A | 30 | 4.254 | 0.160 | 13.24 | 1.059 | 1.0 | 324 | 73 | 343 | FIG. 2 |
|  | B | 256 | 4.086 | 0.180 | 10.67 | 1.085 | 1.0 |  |  |  | FIG. 3 |
|  | C | 38 | 3.715 | 0.180 | 8.66 | 0.881 | 1.0 |  |  |  |  |
| II | A | 30 | 4.403 | 0.138 | 17.39 | 1.035 | — | 324 | 78 | 343 | FIG. 2 |
|  | B | 256 | 4.234 | 0.160 | 13.65 | 1.096 | — |  |  |  | FIG. 3 |
|  | C | 38 | 3.702 | 0.160 | 10.19 | 0.818 | — |  |  |  |  |
| III | A | 30 | 4.403 | 0.148 | 15.50 | 1.049 | 1.0 | 324 | 78 | 343 | FIG. 2 |
|  | B | 256 | 4.234 | 0.169 | 12.35 | 1.095 | 1.0 |  |  |  | FIG. 3 |
|  | C | 38 | 3.702 | 0.169 | 9.23 | 0.816 | 1.0 |  |  |  |  |
| IV | A | 30 | 4.254 | 0.145 | 15.65 | 1.033 | — | 324 | 73 | 343 | FIG. 2 |
|  | B | 256 | 4.086 | 0.165 | 12.72 | 1.085 | — |  |  |  | FIG. 3 |
|  | C | 38 | 3.715 | 0.165 | 10.52 | 0.898 | — |  |  |  |  |
| V | A | 30 | 4.152 | 0.172 | 11.65 | 1.074 | 1.0 | 324 | 69 | 342 | FIG. 2 |
|  | B | 256 | 3.985 | 0.191 | 9.51 | 1.082 | 1.0 |  |  |  | FIG. 3 |
|  | C | 38 | 3.616 | 0.191 | 7.67 | 0.872 | 1.0 |  |  |  |  |

TABLE 4

Results of Evaluation

| | | Example 2 | Example 1 | Compa. Example 1 | Compa. Example 2 | Compa. Example 3 | Example 3 | Example 4 | Example 5 |
|---|---|---|---|---|---|---|---|---|---|
| Core | Composition | a | b | b | b | b | b | c | a |
|  | Diameter (mm) | 39.6 | 39.2 | 39.2 | 39.2 | 39.2 | 39.2 | 40.2 | 39.6 |
|  | Compressive deformation (mm) | 3.3 | 3.1 | 3.1 | 3.1 | 3.1 | 3.1 | 3.7 | 3.3 |
|  | Surface hardness Hc (Shore D) | 53 | 55 | 55 | 55 | 55 | 55 | 49 | 53 |
| Cover | Composition | e | f | f | f | f | f | g | g |
|  | Hardness (Shore D) | 48 | 48 | 48 | 48 | 48 | 48 | 49 | 49 |
|  | Thickness (mm) | 1.6 | 1.8 | 1.8 | 1.8 | 1.8 | 1.8 | 1.3 | 1.6 |
| Ball | Compressive deformation (mm) | 3.0 | 2.8 | 2.8 | 2.8 | 2.8 | 2.8 | 3.5 | 3.0 |
|  | Hardness Hb (Shore D) | 57 | 58 | 58 | 58 | 58 | 58 | 53 | 58 |
|  | Difference (Hb-Hc) | 4 | 3 | 3 | 3 | 3 | 3 | 4 | 5 |
| Dimple | Number | I | I | II | III | IV | V | I | I |
|  | Curvature radius R1 (mm) | 1.0 | 1.0 | — | 1.0 | — | 1.0 | 1.0 | 1.0 |
|  | Occupation ratio Y (%) | 73 | 73 | 78 | 78 | 73 | 69 | 73 | 73 |

TABLE 4-continued

Results of Evaluation

|  | Example 2 | Example 1 | Compa. Example 1 | Compa. Example 2 | Compa. Example 3 | Example 3 | Example 4 | Example 5 |
|---|---|---|---|---|---|---|---|---|
| Coefficient of restitution (Index) | 1.00 | 1.01 | 1.01 | 1.01 | 1.01 | 1.01 | 1.00 | 1.00 |
| Durability (Index) | 108 | 115 | 115 | 115 | 115 | 115 | 106 | 110 |
| Wear resistance (%) | 4 | 4 | 7 | 6 | 6 | 4 | 4 | 3 |
| Flight performance after wear (m) | 201 | 203 | 198 | 199 | 198 | 202 | 201 | 202 |

TABLE 5

Results of Evaluation

| | | Compa. Example 4 | Compa. Example 5 | Compa. Example 6 | Compa. Example 7 | Compa. Example 8 |
|---|---|---|---|---|---|---|
| Core | Composition | a | a | a | c | a |
| | Diameter (mm) | 39.6 | 39.6 | 40.2 | 39.6 | 38.4 |
| | Compressive deformation (mm) | 3.3 | 3.3 | 3.3 | 3.7 | 3.3 |
| | Surface hardness Hc (Shore D) | 53 | 53 | 53 | 49 | 53 |
| Cover | Composition | d | d | e | h | g |
| | Hardness (Shore D) | 48 | 48 | 48 | 57 | 49 |
| | Thickness (mm) | 1.6 | 1.6 | 1.3 | 1.6 | 2.2 |
| Ball | Compressive deformation (mm) | 3.0 | 3.0 | 3.0 | 3.1 | 3.1 |
| | Hardness Hb (Shore D) | 57 | 57 | 56 | 61 | 55 |
| | Difference (Hb-Hc) | 4 | 4 | 3 | 12 | 2 |
| Dimple | Number | I | II | II | I | III |
| | Curvature radius R1 (mm) | 1.0 | — | — | 1.0 | 1.0 |
| | Occupation ratio Y (%) | 73 | 78 | 78 | 73 | 78 |
| Coefficient of restitution (Index) | | 1.00 | 1.00 | 1.01 | 1.01 | 0.98 |
| Durability (Index) | | 100 | 100 | 105 | 98 | 108 |
| Wear resistance (%) | | 8 | 10 | 7 | 9 | 6 |
| Flight performance after wear (m) | | 197 | 192 | 196 | 195 | 197 |

As shown in Tables 4 and 5, the golf ball of each Example has excellent durability and wear resistance. From the results of evaluation, advantage of the present invention is clear.

The above description is merely for illustrative examples, and various modifications can be made without departing from the principles of the present invention.

What is claimed is:

1. A golf ball comprising a core and a cover positioned outside the core, the golf ball having numerous dimples on a surface of the cover, wherein
the cover is formed of a resin composition including thermoplastic polyurethane (A) and a polyisocyanate mixture (B),
the polyisocyanate mixture (B) includes a urethane prepolymer (B2) having two or more isocyanate groups,
the cover has a hardness, measured with a Shore D type hardness scale, of 30 or greater and 55 or less,
the cover has a thickness of 1.0 mm or greater and 2.0 mm or less,
a difference (Hb−Hc) between a hardness Hb of the golf ball and a hardness Hc of the core which are measured with the Shore D type hardness scale is equal to or greater than −10 and equal to or less than 10,
a ratio of the total area of all the dimples to a surface area of a phantom sphere of the golf ball is less than 75%, and
the numerous dimples include a dimple having a curvature radius at an edge thereof in a range of 0.1 mm to 10 mm.

2. The golf ball according to claim 1, wherein an amount of the polyisocyanate mixture (B) in the resin composition of the cover is equal to or greater than 1 part by weight and equal to or less than 40 parts by weight, per 100 parts by weight of the thermoplastic polyurethane (A).

3. The golf ball according to claim 1, wherein an amount of isocyanate groups in the polyisocyanate mixture (B) is equal to or greater than 0.1% by weight and equal to or less than 10% by weight.

4. The golf ball according to claim 1, wherein an MDI-based thermoplastic polyurethane is used for the cover.

5. The golf ball according to claim 1, wherein the polyisocyanate mixture (B) includes a thermoplastic resin (B3) which substantially does not react with an isocyanate group, and the urethane prepolymer (B2) is dispersed in the thermoplastic resin (B3).

6. The golf ball according to claim 1, wherein a ratio of a number of dimples with a curvature radius at an edge thereof in a range of 0.1 mm to 10 mm, to the total number of the dimples, is equal to or greater than 50%.

7. The golf ball according to claim 1, wherein the numerous dimples include a dimple having a curvature radius at an edge thereof in a range of 0.1 mm to 1.0 mm.

8. The golf ball according to claim 1, wherein the thermoplastic polyurethane (A) includes a residue obtained by reacting thermoplastic polyurethane with a urethane prepolymer (B2) having two or more isocyanate groups.

9. The golf ball according to claim 6, wherein 100% of the dimples have a curvature radius at an edge thereof in a range of 0.1 mm to 10 mm.

10. The golf ball according to claim 2, wherein an amount of isocyanate groups in the polyisocyanate mixture (B) is equal to or greater than 0.1% by weight and equal to or less than 10% by weight.

* * * * *